C. HARRELL.
ROPE SLIDE.
APPLICATION FILED JULY 7, 1909.
935,151.
Patented Sept. 28, 1909.
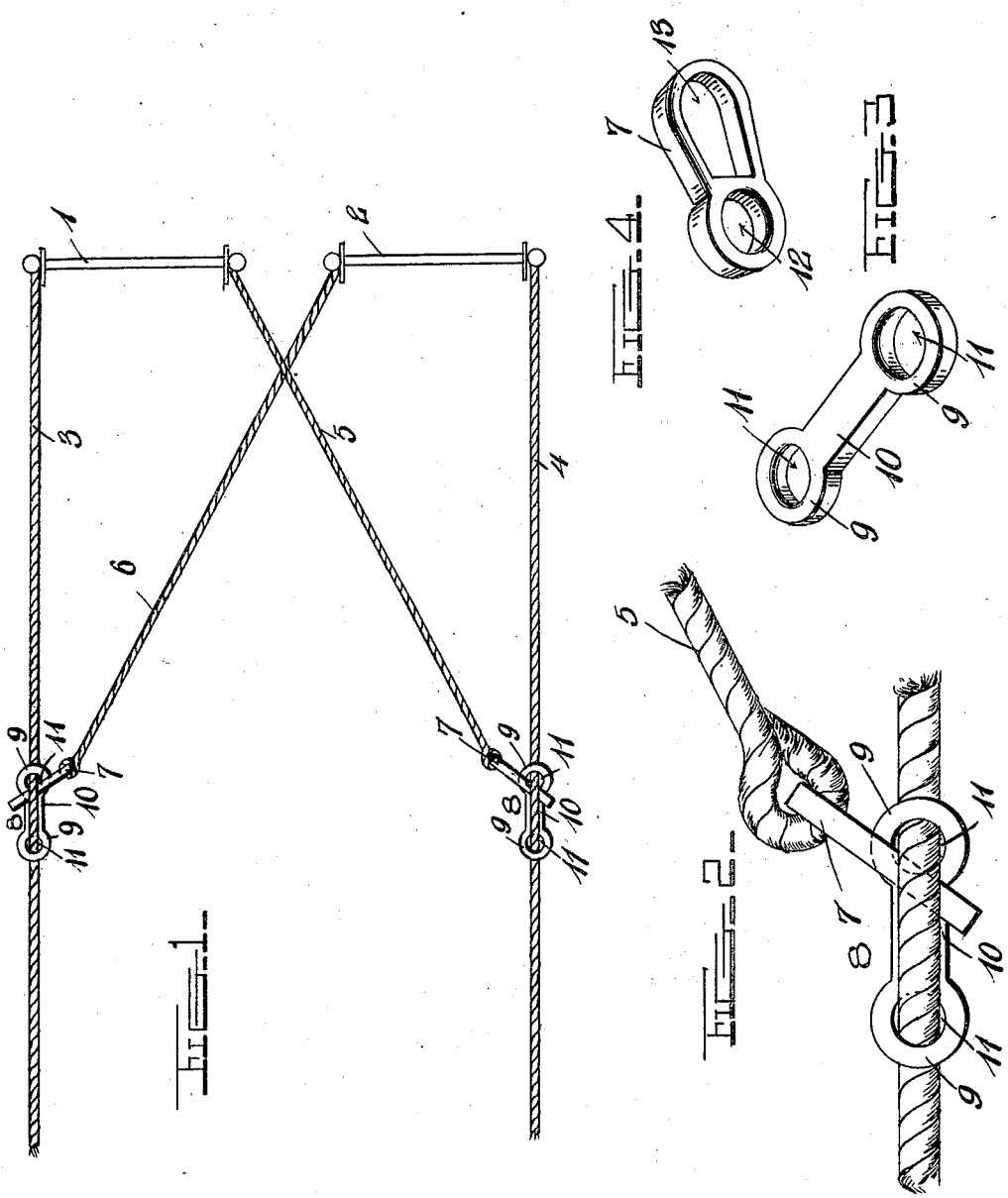
Witnesses
E. O. Crocker
C. H. Griesbauer
Inventor
Conrad Harrell.
by H. B. Willson & Co.
Attorneys

UNITED STATES PATENT OFFICE.

CONRAD HARRELL, OF WHIGHAM, GEORGIA.

ROPE-SLIDE.

935,151.               Specification of Letters Patent.     Patented Sept. 28, 1909.

Application filed July 7, 1909. Serial No. 506,269.

*To all whom it may concern:*

Be it known that I, CONRAD HARRELL, a citizen of the United States, residing at Whigham, in the county of Grady and State of Georgia, have invented certain new and useful Improvements in Rope-Slides; and I do declare the following to be a full, clear, and exact description of the invention, such as will enable others skilled in the art to which it appertains to make and use the same.

This invention relates to coupling devices and the object of the invention is the provision of a novel rope slide by which the cross lines of double plow harness may be connected to the main lines and whereby the connection with the main lines may be lengthened or shortened as desired.

With these and other objects in view, the invention consists of certain novel features of construction, combination and arrangements of parts as will be more fully described and particularly pointed out in the appended claims.

In the drawings, Figure 1 is a diagrammatic plan view showing the bridle bits together with the cross lines connected to the main lines by my improved coupling; Fig. 2 is a detail plan view on an enlarged scale of one of the coupling devices showing the cross line attached thereto and the main line running through the coupling; Fig. 3 is a detail perspective view of the main line slide; and Fig. 4 is a detail perspective view of the cross line coupling.

Referring more especially to the drawings, 1 and 2 represent the bridle bits to which are connected on their outsides, the main lines 3 and 4. The cross lines are shown at 5 and 6, as having their forward ends connected to the inner ends of the bridle bits and their rear ends connected to the members 7 of the coupling. Each main line has mounted thereon a slide which comprises an elongated member 8, having apertured heads 9, on either end thereof connected by an attenuated neck 10. These apertured ends or heads form eyes 11, for the passage of the main lines 3 and 4, which pass through one eye in a forward direction and through the opposite eye in a downward direction or vice versa. In other words the rope lines pass through the opposite eyes in opposite directions.

The members 7, comprise an elongated body with an eye 12, formed in one end so as to be adapted to receive a loop formed in the ends of the cross lines 5 and 6 and the inner end of the member is provided with an elongated slot 13, which is adapted to surround the neck 10, and sufficiently large to pass over the heads 9. As shown in Fig. 2, the slotted end of the body 7, surrounds the neck 10 beneath the ropes 3 and 4 so that the member 7 can not slip off of the slide 8 in either direction.

The kink formed in the main lines by reason of its passage over the body 7, and its extension through the eyes 11 causes the slide to bind firmly upon the rope and prevent any movement thereof. When strain is put upon either of the main lines, the slide 8, moves through the slot 13, and pulls that end of the member 7 at an acute angle to the slide 8. In this position, the slide 7 forces that portion of the rope which passes through the forward eye of the slide 8 into engagement with the forward wall of said eye whereby it is firmly held in adjusted position. When it is desired to shorten the connection of the coupling, the rope is loosened in first one eye and then the other of each individual slide 8, and the cross lines 5 and 6 may be shortened in any suitable manner. Thus the bits are maintained in proper position. The reverse may be resorted to when it is desired to lengthen the connection.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having thus described my invention, what I claim is:

1. A coupling for double harness lines comprising a slide having eyes at each end and an attenuated neck, and a coupling member adapted to slide over the attenuated neck to clamp the rope in the eyes.

2. A coupling device comprising a slide having a pair of eyes formed in opposite ends and an attenuated neck, a coupling member having an eye formed in one end and a slot in its opposite end adapted to receive the attenuated neck of the slide, a rope connected to the eye of the coupling member, and a rope passing through the eyes of the slide in opposite directions and lying over the coupling member.

In testimony whereof I have hereunto set my hand in presence of two subscribing witnesses.

CONRAD HARRELL.

Witnesses:
S. HARRELL,
T. J. MILLS.